(12) United States Patent
Farley et al.

(10) Patent No.: US 11,419,268 B2
(45) Date of Patent: Aug. 23, 2022

(54) MULTI-SEGMENT HEADER FOR AN AGRICULTURAL HARVESTER

(71) Applicant: CNH Industrial America LLC, New Holland, PA (US)

(72) Inventors: Herbert M. Farley, Elizabethtown, PA (US); Stephen Todderud, Lancaster, PA (US); Joel T. Cook, Akron, PA (US); Cory M. Conway, Maquoketa, IA (US)

(73) Assignee: CNH Industrial America LLC, New Holland, PA (US)

( * ) Notice: Subject to any disclaimer, the term of this patent is extended or adjusted under 35 U.S.C. 154(b) by 195 days.

(21) Appl. No.: 16/657,393

(22) Filed: Oct. 18, 2019

(65) Prior Publication Data

US 2021/0112716 A1 Apr. 22, 2021

(51) Int. Cl.
*A01D 41/14* (2006.01)
*A01D 34/04* (2006.01)
*A01D 34/13* (2006.01)

(52) U.S. Cl.
CPC ............ *A01D 41/14* (2013.01); *A01D 34/04* (2013.01); *A01D 34/13* (2013.01)

(58) Field of Classification Search
CPC ........ A01D 41/14; A01D 34/04; A01D 34/13; A01D 41/144
See application file for complete search history.

(56) References Cited

U.S. PATENT DOCUMENTS

| | | | | | |
|---|---|---|---|---|---|
| 2,867,958 | A | * | 1/1959 | Allen | A01D 41/16 56/15.7 |
| 3,109,273 | A | * | 11/1963 | Soldner | A01D 75/20 56/190 |
| 3,474,602 | A | * | 10/1969 | Molzahn | A01D 43/00 56/14.4 |
| 3,913,247 | A | * | 10/1975 | Ruhl | E01H 5/098 37/258 |
| 4,085,570 | A | * | 4/1978 | Joray | A01D 43/00 56/12.7 |
| 4,133,165 | A | | 1/1979 | Hoch | |
| 4,956,966 | A | * | 9/1990 | Patterson | A01D 41/14 56/181 |
| 5,005,343 | A | * | 4/1991 | Patterson | A01D 41/14 56/14.4 |
| 5,557,912 | A | * | 9/1996 | Voss | A01D 41/06 56/130 |

(Continued)

FOREIGN PATENT DOCUMENTS

| | | |
|---|---|---|
| EP | 553506 A1 | 8/1993 |
| EP | 2446729 A1 | 5/2012 |

OTHER PUBLICATIONS

International Search Report and Written Opinion for PCT application PCT/US2020/055403, dated Dec. 21, 2020 (10 pages).

*Primary Examiner* — Arpad Fabian-Kovacs
(74) *Attorney, Agent, or Firm* — Peter K. Zacharias; Patrick M. Sheldrake (57) ABSTRACT

A multi-segment header for an agricultural harvester including a multi-segment chassis and a backsheet supported by each of the multi-segment chassis. The multi-segment header further includes a backsheet extension assembly that has a backsheet extension mounted adjacent a top end of each backsheet, and an articulating joint extending between adjacent backsheet extensions. The articulated backsheet extension assembly follows upward and downward movement of the backsheets of the multi-segment chassis and blocks grain from passing over the backsheets and going unharvested.

17 Claims, 10 Drawing Sheets

(56) References Cited

U.S. PATENT DOCUMENTS

| | | | | |
|---|---|---|---|---|
| 7,520,117 B2* | 4/2009 | Rieck | A01D 45/021 | 56/62 |
| 7,857,120 B1* | 12/2010 | Perring | B65G 33/24 | 198/671 |
| 7,921,627 B2* | 4/2011 | Sauerwein | A01D 34/14 | 56/181 |
| 8,061,114 B2* | 11/2011 | Mossman | A01D 45/021 | 56/51 |
| 8,166,738 B1* | 5/2012 | Coers | A01D 61/002 | 56/181 |
| 8,176,716 B2* | 5/2012 | Coers | A01D 57/02 | 56/364 |
| 8,484,939 B1* | 7/2013 | Cormier | A01D 43/06 | 56/181 |
| 9,301,445 B1* | 4/2016 | Seeliger | A01D 89/008 | |
| 9,675,007 B2* | 6/2017 | Schrattenecker | A01D 41/14 | |
| 9,750,189 B2* | 9/2017 | Honey | A01D 57/02 | |
| 9,750,190 B2* | 9/2017 | Mossman | A01D 61/008 | |
| 9,820,434 B2* | 11/2017 | McCrea | A01D 34/14 | |
| 10,299,435 B2 | 5/2019 | Noll | | |
| 2007/0193243 A1* | 8/2007 | Schmidt | A01D 57/20 | 56/181 |
| 2007/0204588 A1* | 9/2007 | Neece | A01D 45/021 | 56/119 |
| 2008/0098705 A1* | 5/2008 | Salley | A01D 41/06 | 56/16.4 R |
| 2010/0281835 A1* | 11/2010 | Tipnis | A01D 41/14 | 56/1 |
| 2010/0326035 A1* | 12/2010 | Schrattenecker | A01D 41/14 | 56/51 |
| 2012/0047866 A1* | 3/2012 | Fuechtling | A01D 41/14 | 56/153 |
| 2012/0311987 A1* | 12/2012 | Koch | A01D 41/14 | 56/229 |
| 2013/0111869 A1* | 5/2013 | Koch | A01D 41/14 | 56/320.1 |
| 2013/0298516 A1* | 11/2013 | Houston | A01D 41/12 | 56/207 |
| 2015/0313084 A1 | 11/2015 | Cook et al. | | |
| 2018/0084721 A1* | 3/2018 | Walker | A01D 61/002 | |
| 2018/0271019 A1* | 9/2018 | Noll | A01D 45/021 | |
| 2020/0359564 A1* | 11/2020 | Bell | A01D 61/008 | |

* cited by examiner

MULTI-SEGMENT HEADER FOR AN AGRICULTURAL HARVESTER

The exemplary embodiments of present invention relate generally to a header of a plant cutting machine (e.g., a combine harvester) and, more specifically, to a multi-segment header equipped with a backsheet extension assembly.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongated sickle mechanism that reciprocates sidewardly relative to a non-reciprocating guard structure. After crops are cut, they are collected inside the header and transported via a conveyor such as a draper belt towards a feederhouse located centrally of the header.

Oftentimes the header is constructed with a multi-segment chassis, the segments of which may be fixed or movable relative to one another. A backsheet is supported by each segment of the multi-segment chassis. A disadvantage of such a header is that, when harvesting tall bushy crops, seed and crop material can fall over the backsheet and out of the header, whereby such material goes unharvested.

SUMMARY OF THE INVENTION

In accordance with an exemplary embodiment there is provided a multi-segment header for an agricultural harvester comprising a multi-segment chassis and a backsheet supported by each segment of the multi-segment chassis. The multi-segment header further comprises a backsheet extension assembly that includes a backsheet extension mounted adjacent a top end of each backsheet, and an articulating joint extending between adjacent backsheet extensions.

An aspect of the exemplary embodiment is that each backsheet extension extends substantially in end to end relation with each segment of the multi-segment chassis. So constructed and arranged, the backsheet effectively prevents seed and crop material from falling over the backsheet extension assembly and out of the header, whereby such material is effectively harvested by the header.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
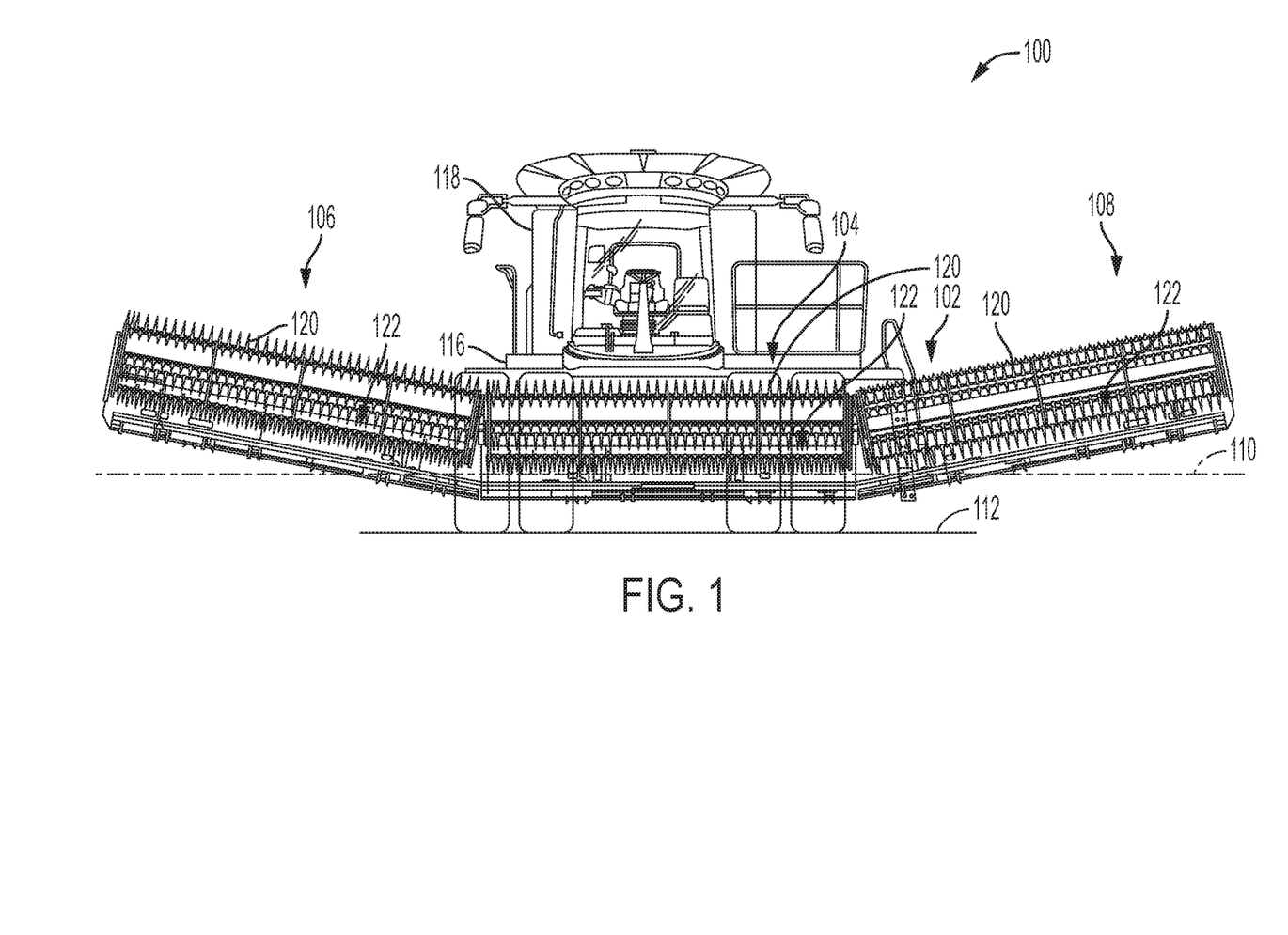
FIG. 1 is a front elevation view of an agricultural harvester including a header having a multi-segment chassis.

Referring to the drawings, FIG. 1 shows a front view of an exemplary harvester 100. The harvester 100 includes a header 102. The header 102 can be, e.g., in the form of a multi-segment header including a pivoting structure having a central segment or section 104 (e.g., fixed frame) with right and left segments or wings 106, 108 (e.g., pivot wings) capable of pivoting relative to the central section 104 to accommodate uneven terrain while providing a wide header for greater crop capacity. A horizontal plane 110 extends through the header 102 and can be substantially parallel to the ground 112 during use over generally even terrain. In some embodiments, discussed below, the header 102 can include one or more augers to assist in guiding crop from the header 102 into a processing system 116 within the harvester 100 (e.g., below the cab 118). In some embodiments, a draper belt system 122 can be used to guide crop from the header 102 into the processing system 116. In other embodiments, discussed below, the header may employ both augers and draper conveyors to guide crop from the header into the processing system 116. The auger can rotate about a longitudinal axis extending substantially parallel to horizontal when the right and left wings 106, 108 are in the unflexed or non-linear position. The central section 104 and the right and left wings 106, 108 can include reels 120. The harvester 100 can further include a cutter bar configured to cut crop and flex as the right and left wings 106, 108 pivot relative to the central section 104.

Figure 2:
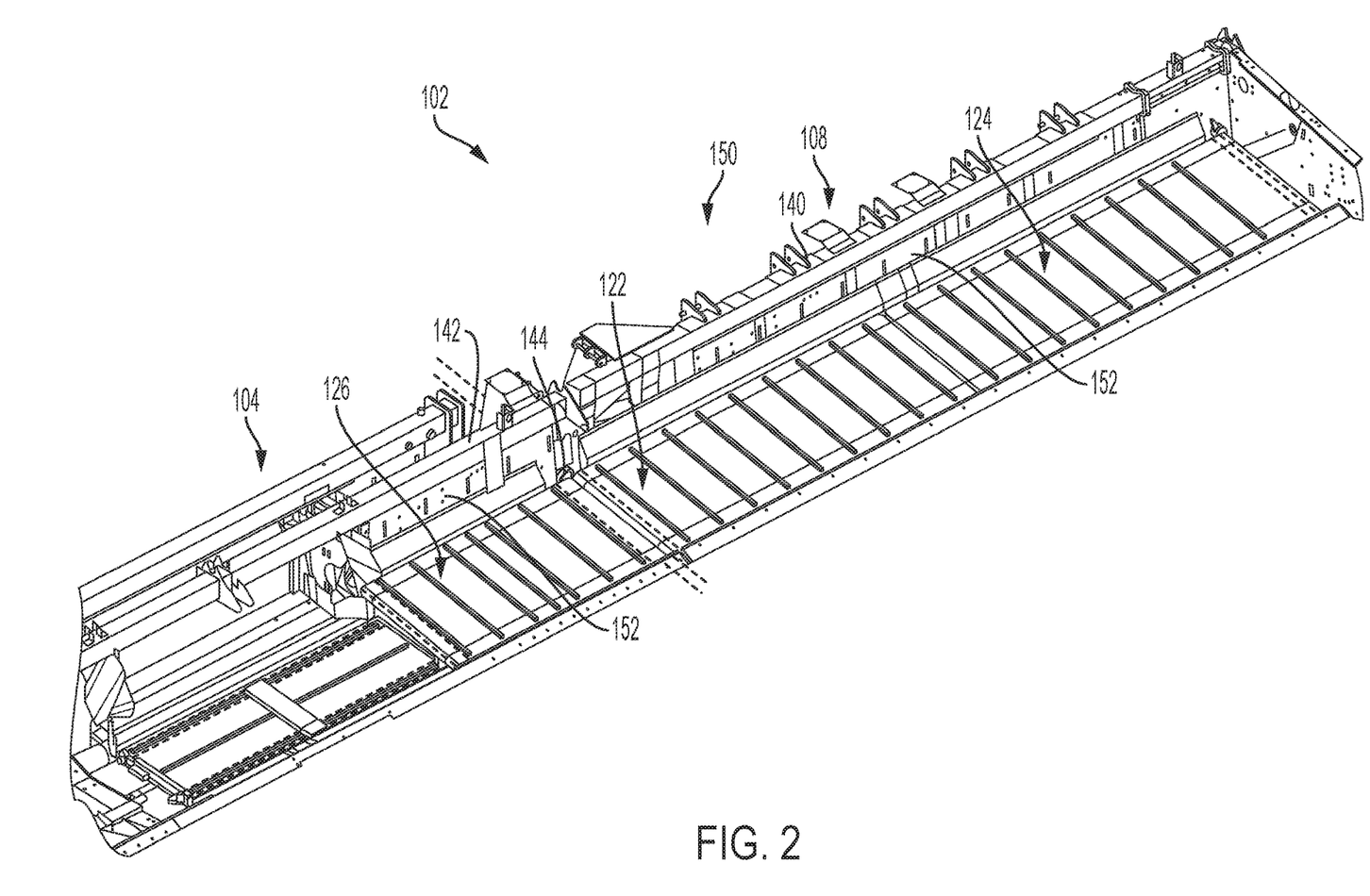
FIG. 2 is a perspective view of a portion of the multi-segment chassis header of FIG. 1 with certain elements omitted for purposes of illustration.
Figure 6:
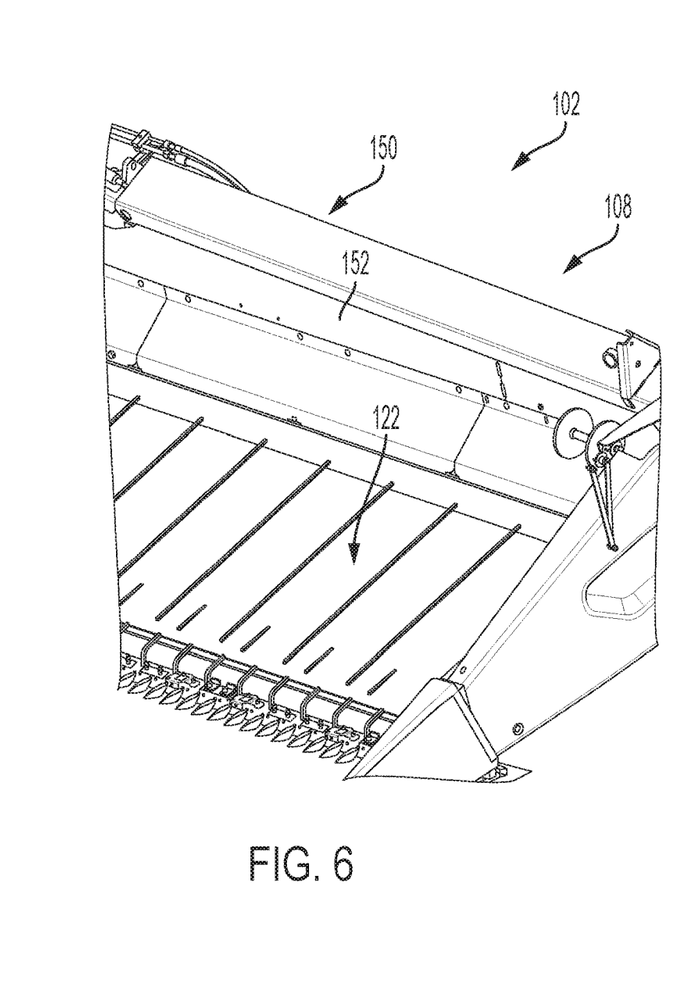
FIG. 6 is a perspective view of an end portion of the agricultural harvester header of FIG. 3 with the backsheet extensions omitted.
Figure 7A:
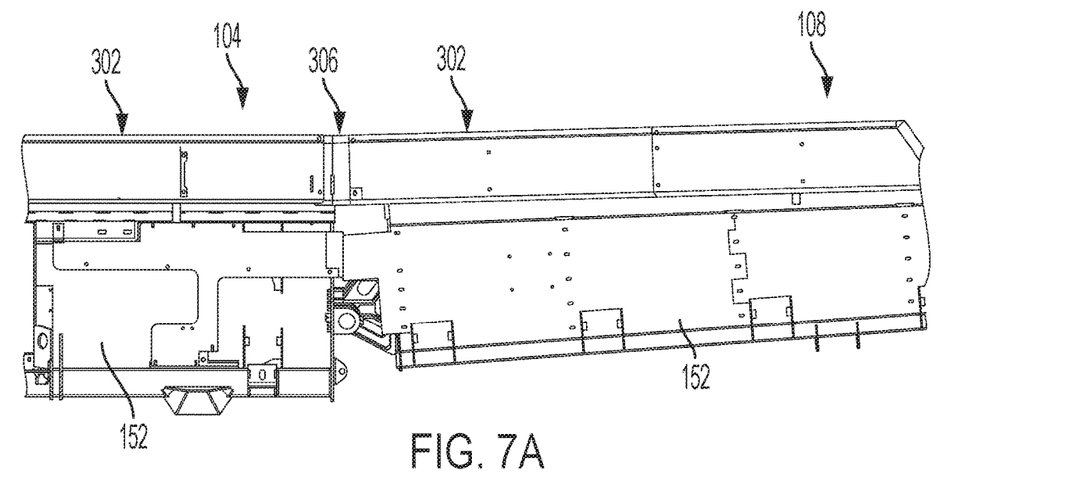
FIG. 7A is a rear view of adjacent backsheets and backsheet extensions of a multi-segment header in accordance with an exemplary embodiment of the subject disclosure articulated in a first direction.
Figure 7B:
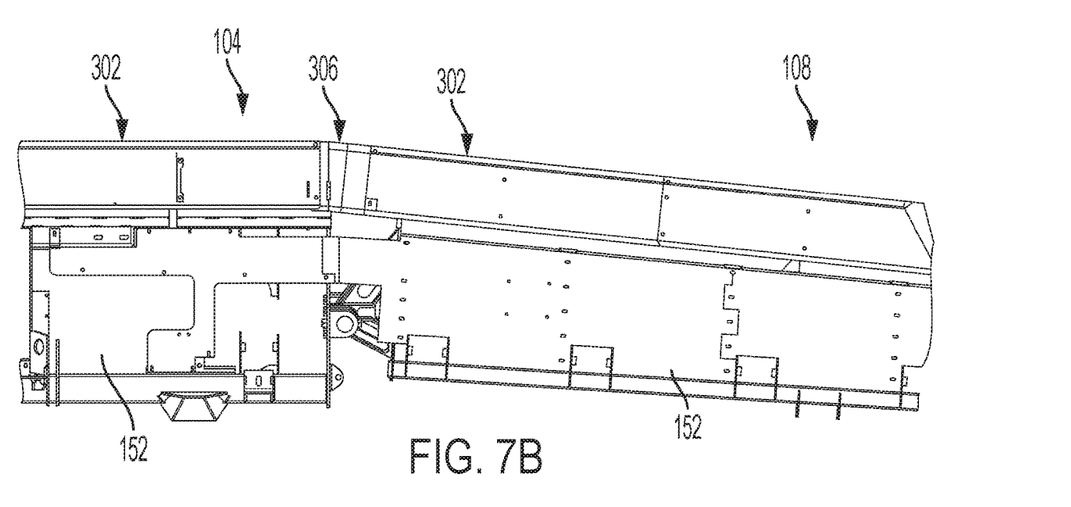
FIG. 7B is a rear view of adjacent backsheets and backsheet extensions of a multi-segment header in accordance with an exemplary embodiment of the subject disclosure articulated in a second direction.
Figure 8:
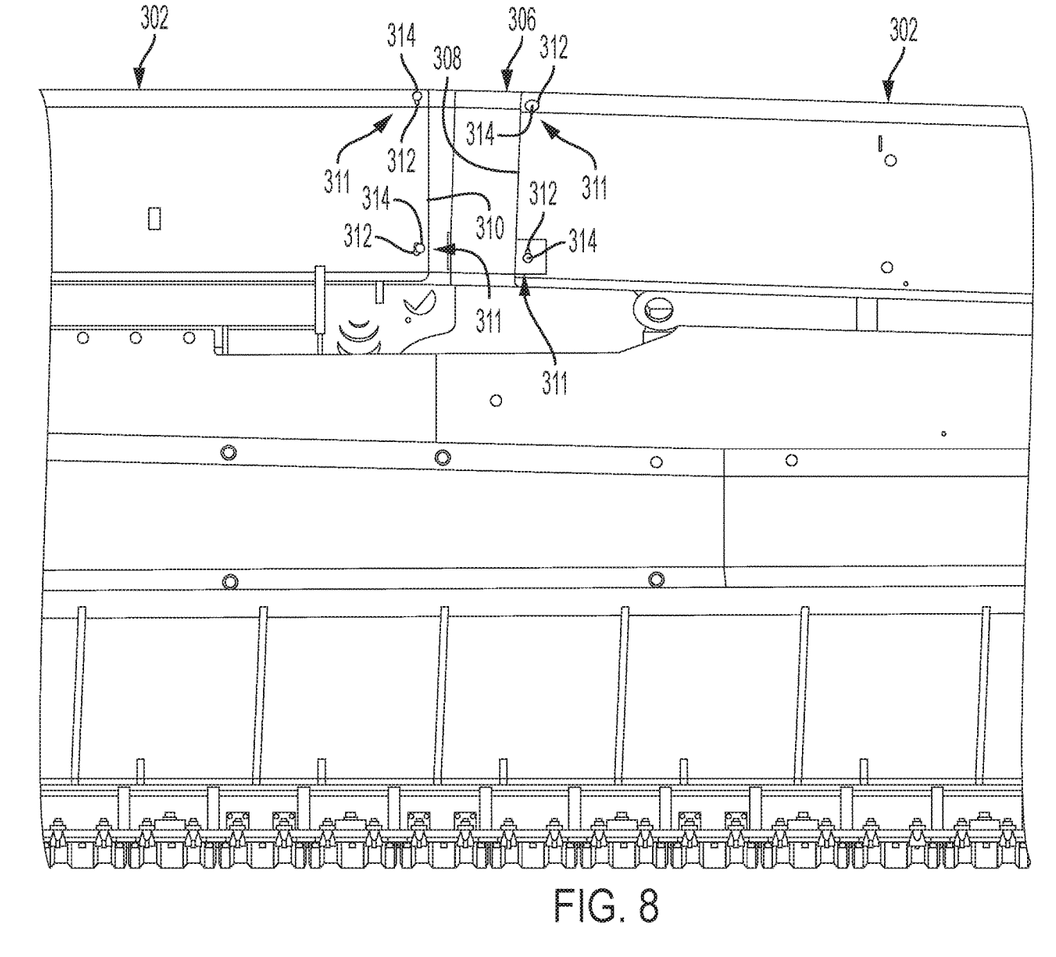
FIG. 8 is a front view of an agricultural harvester header showing an articulating joint between adjacent backsheet extensions in accordance with a further exemplary embodiment of the subject disclosure.

FIGS. 2 and 6 are perspective views of a partial assembly of the header 102. Although discussed with respect to the left wing 108, it should be understood that the right wing 106 has a substantially similar structure and/or function. The header 102 includes a draper belt system 122 for transferring harvested crop from the left wing 108 to the central section 104 such that the central section 104 can introduce the crop into the processing system 116. The draper belt system 122 includes a first draper belt assembly 124 at the left wing 108 and a second draper belt assembly 126 at the central section 104 disposed adjacent to the first draper belt assembly 124. The header 102 includes a draper frame 140 associated with the left wing 108 and a draper frame 142 associated with the central section 104. The draper frames 140, 142 form part of a multi-segment chassis 150, discussed below, and rotatably couple at a pivot joint 144 disposed between the draper frames 140, 142 such that the left wing 108 can pivot relative to the central section 104. That is, a longitudinal axis of the left wing 108 can pivot or move relative to a longitudinal axis of the central section 104. The multi-segment header 102 thus comprises the multi-segment chassis 150.

As shown in FIG. 2, a backsheet 152 is supported by each segment of the multi-segment chassis 150. A backsheet is a panel that keeps grain and seed redirected onto the draper belt system 122 whereby the draper belt system can convey the grain and seed into the processing system 116. In this regard, only central segment 104 and left wing segment 108 are shown. It is to be understood that right wing segment 106 is similarly provided with a backsheet.

Figure 3:
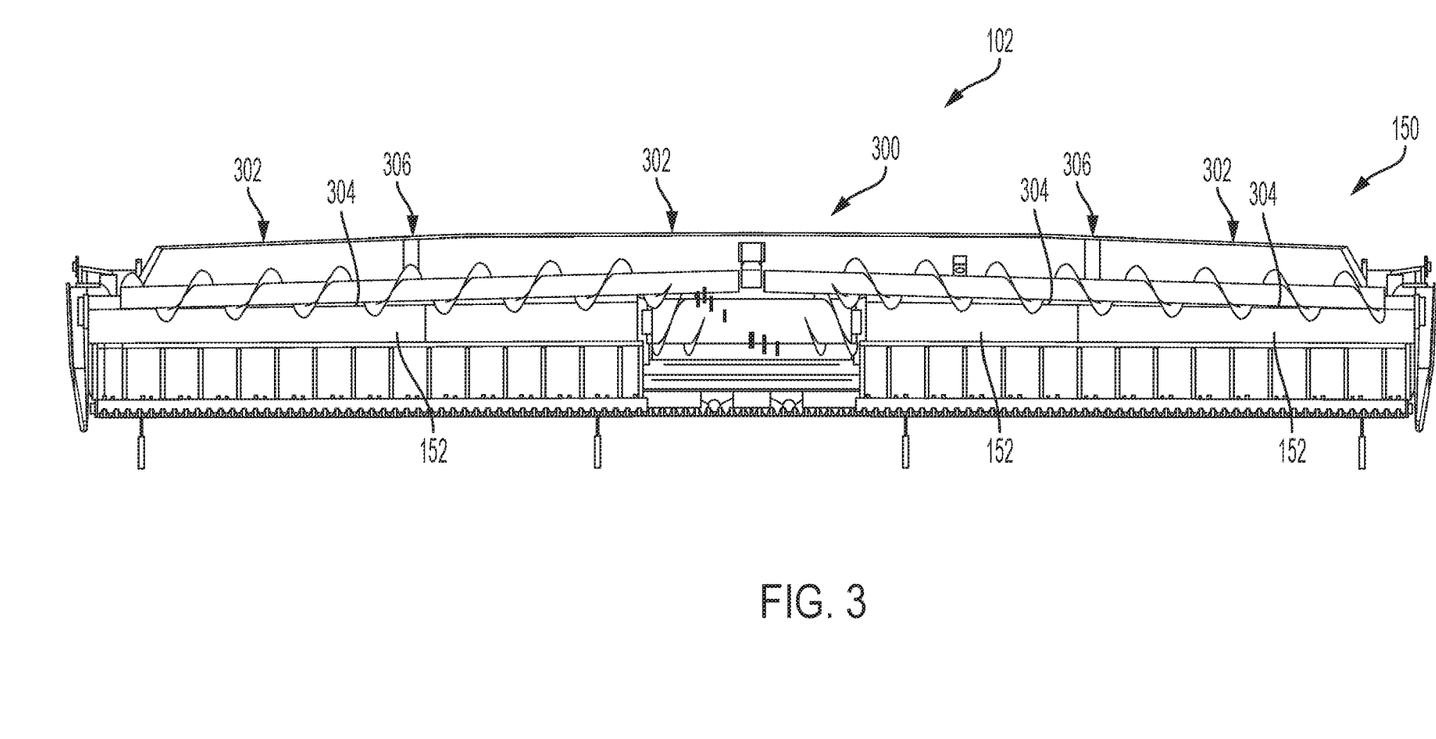
FIG. 3 is a front view of an agricultural harvester header including a backsheet extension assembly in accordance with an exemplary embodiment of the subject disclosure.
Figure 4:
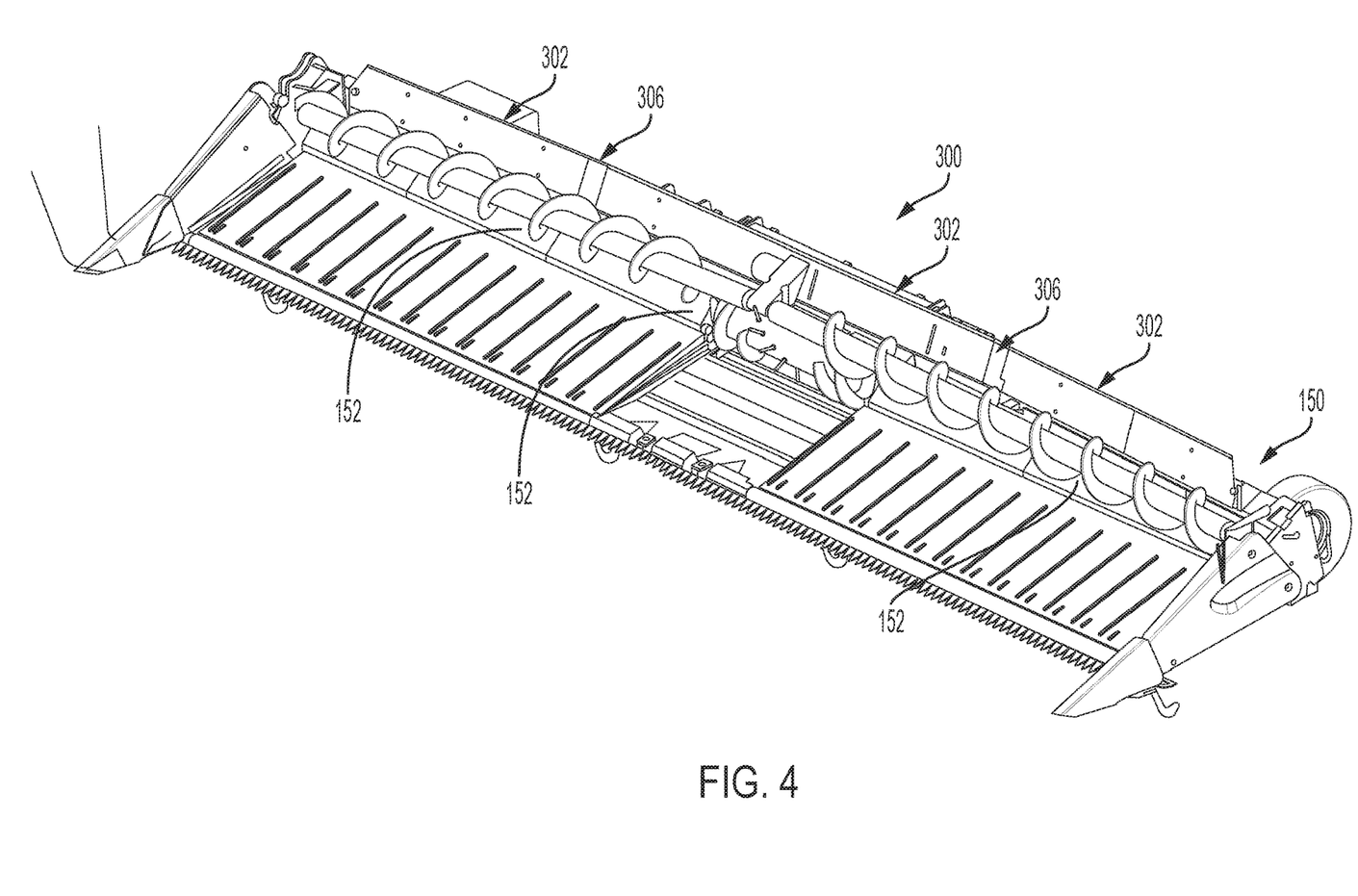
FIG. 4 is a perspective view of the agricultural harvester header of FIG. 3.
Figure 5:
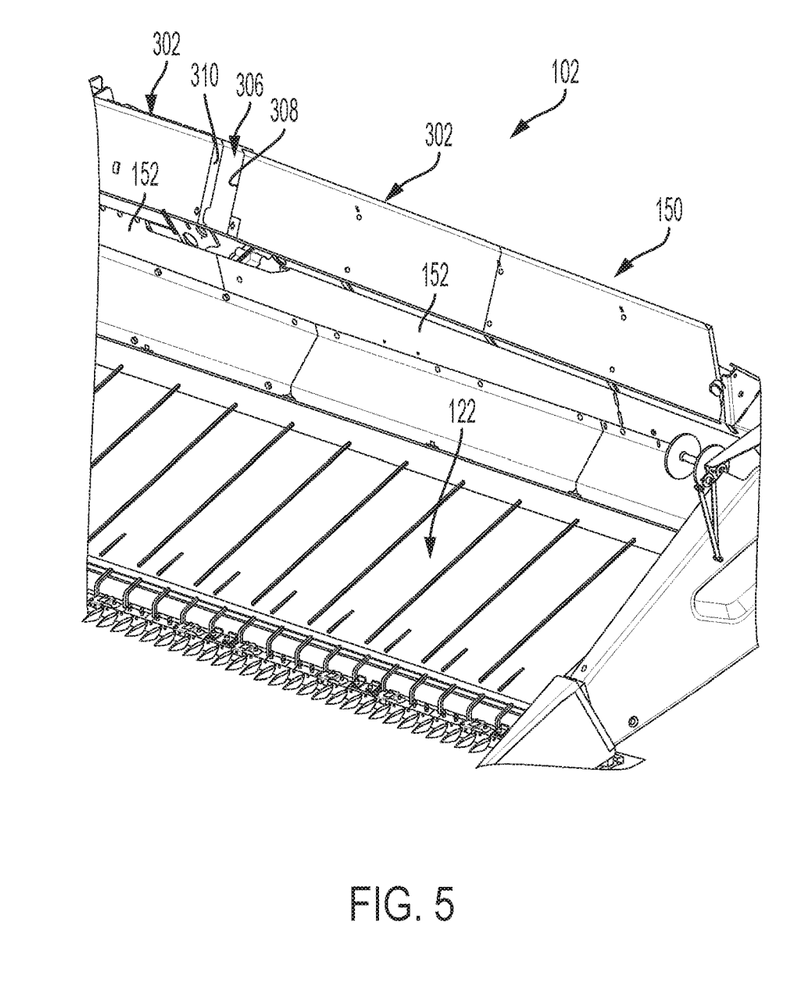
FIG. 5 is a perspective view of an end portion of the agricultural harvester header of FIG. 3.

Referring to FIGS. 3 and 4, the multi-segment header further comprises a backsheet extension assembly 300 including a backsheet extension 302 mounted adjacent a top end 304 of each backsheet 152. The backsheet extension assembly also includes an articulating joint 306 extending between adjacent backsheet extensions 302.

According to an aspect, each backsheet extension 302 is plate-shaped and is directly mounted to the top end 158 of each backsheet 152. Each backsheet extension extends substantially in end to end relation with each segment 104, 106, and 108 of the multi-segment chassis 150. The backsheet extension 302 is mounted to the backsheet such that its major plane slopes forwardly relative to the chassis and the combine direction of travel, e.g., a horizontal plane of the chassis, at an angle of about 30° to 60°. In this way, grain and seed striking the backsheet extension is captured and directed downwardly into the header onto the draper belt system 122 whereby it is conveyed to the processing system 116. In an aspect the backsheet extension can have an overall height of about 5 to 15 inches, and preferably about 8 inches.

Figure 9:
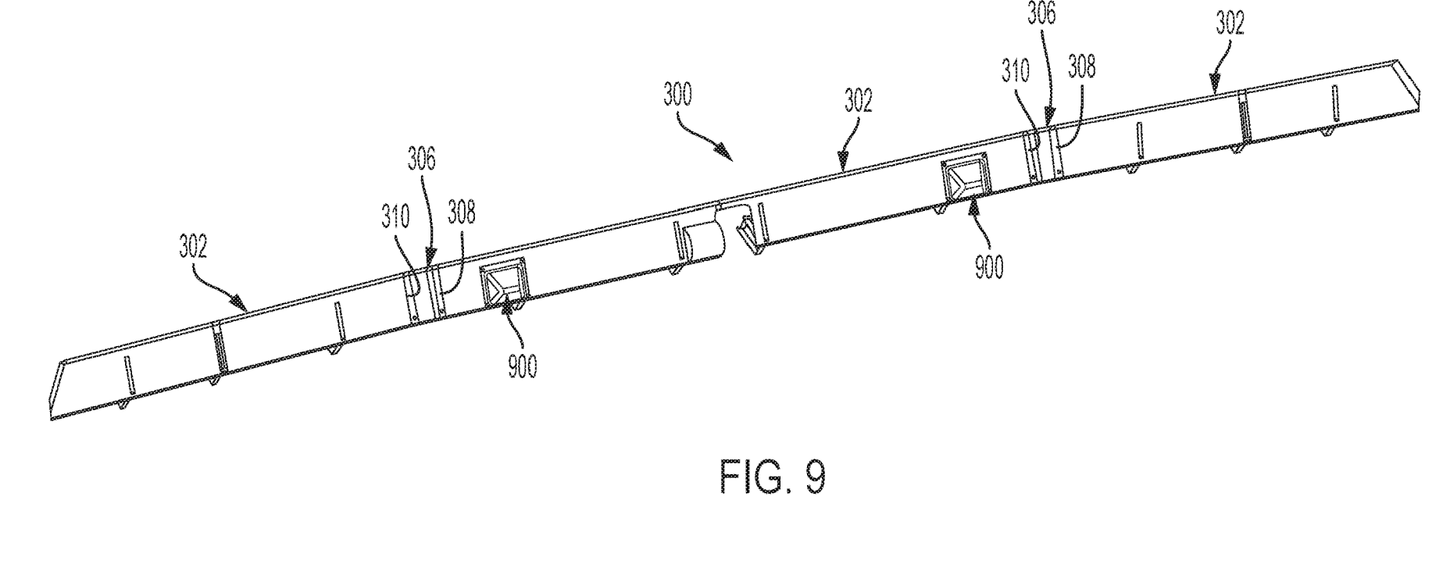
FIG. 9 is a rear view of three backsheet extensions joined by two articulating joints in accordance with an exemplary embodiment of the subject disclosure.
Figure 10:
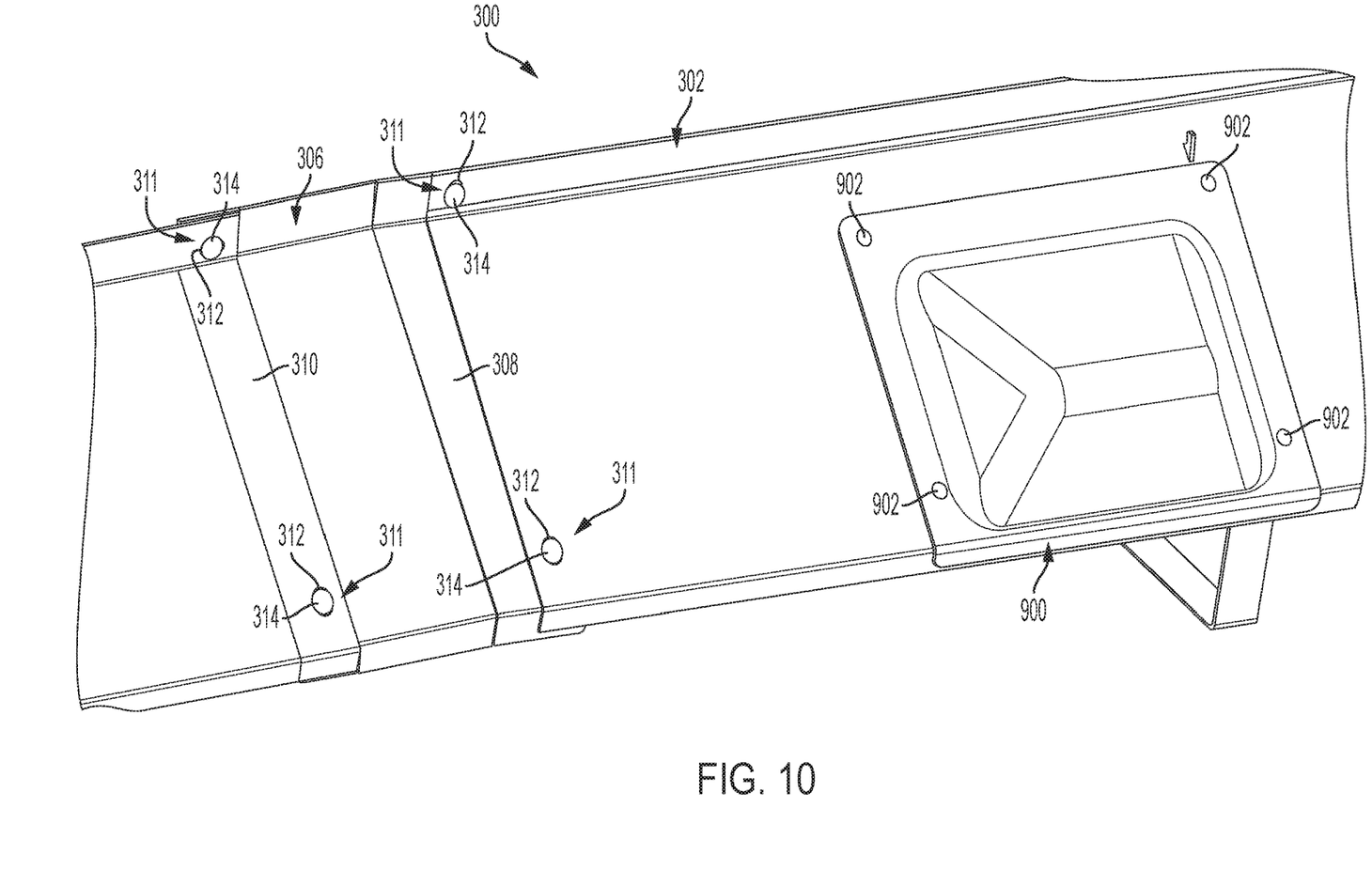
FIG. 10 is an enlarged rear view of two backsheet extensions joined by an articulating joint and a removable access panel for enabling access to structure of an agricultural harvester header.

At least one of the backsheet extensions 302 includes an access panel 900 (FIGS. 9 and 10) for providing access to header structure such as, for example, a chassis hook opening and/or a reel pivot axis. The access panel 900 may be substantially square or rectangular in shape and projects rearwardly from the rear surface of the backsheet extension so as to accommodate the aforementioned header structure. As shown most clearly in FIG. 10, the access panel 900 is releasably connected to the backsheet extension by one or more fasteners 902.

Referring to FIGS. 3, 4, 5, 7A, 7B, 8, 9 and 10, the articulating joint 306 spans an entire height of the adjacent backsheet extensions 302. According to an aspect, the articulating joint 306 comprises a flexible polymer, e.g., an elastomer which permits the left wing segment 108 to pivot upwardly (FIG. 7A) and downwardly (FIG. 7B) relative to the central segment 104, as well as forwardly and backwardly, i.e., in at least four degrees of freedom.

According to another aspect, as shown in FIGS. 5, 8, 9 and 10, the articulating joint 306 comprises a first slotted end 308 for receiving one of the segmented backsheet extensions 302, and a second slotted end 310 opposite the first slotted end for receiving an adjacent segmented backsheet extension. The articulating joint 306 further comprises a fastener 311 for fastening the articulating joint to the backsheet extension. The fastener 311 can be, e.g., a through hole 312 and a pin 314 or another suitable fastener for the intended purpose. The articulating joint 306 of FIGS. 5, 8, 9 and 10 likewise permits the wing segments 106, 108 to pivot upwardly, downwardly, forwardly and rearwardly relative to the central segment 104.

Figure 11:
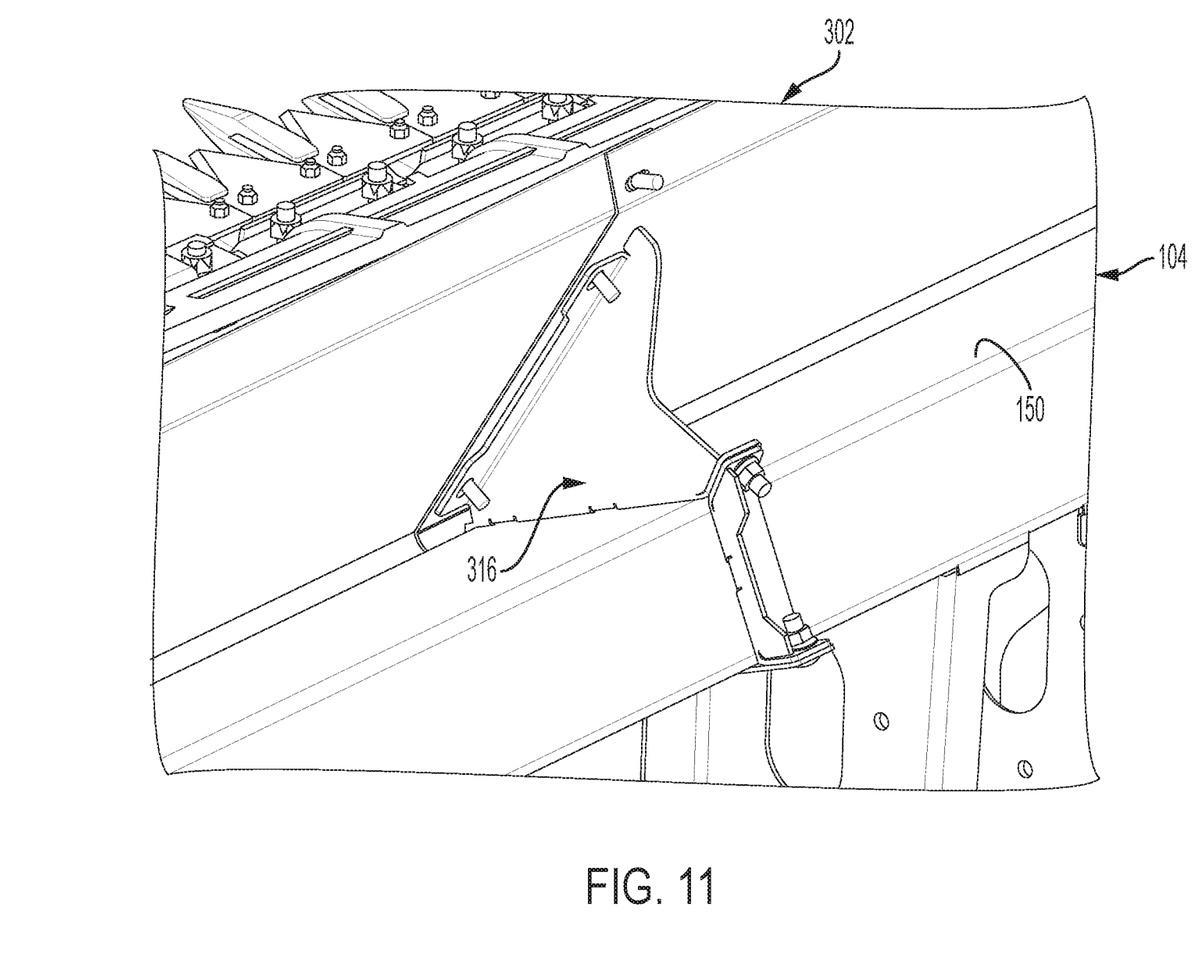
FIG. 11 is a perspective view of a mounting bracket mounting a backsheet extension to a header chassis.

In accordance with another aspect (FIG. 11), the multi-segment header further comprises a mounting bracket 316 mounting each backsheet extension 302 to the chassis 150. The mounting bracket can be configured as shown in FIG. 11, and may be bolted or otherwise secured to both the backsheet extension 302 and the chassis 150 via fasteners.

Provision of the backsheet extension assembly disclosed herein enables the end backsheet extensions thereof to pivot upwardly and downwardly with their associated backsheets and capture grain and seed in the header 102 which would otherwise go unharvested. In addition, the backsheet extension assembly may be used with multi-segment headers wherein the header segments are fixed (i.e., do not pivot) relative to one another whereby grain and seed is likewise captured by such headers.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A multi-segment header for an agricultural harvester comprising:
   a multi-segment chassis;
   a backsheet supported by each segment of the multi-segment chassis; and
   a backsheet extension assembly that includes:
      a backsheet extension mounted adjacent a top end of each backsheet, and
      a polymeric articulating joint having at least four degrees of freedom and extending between adjacent backsheet extensions.

2. The multi-segment header of claim 1, wherein the articulating joint spans an entire height of the adjacent backsheet extensions.

3. The multi-segment header of claim 1, wherein the polymeric articulating joint comprises an elastomer.

4. The multi-segment header of claim 1, wherein the polymeric articulating joint comprises a first slotted end for receiving one of the segmented backsheet extensions, and a second slotted end opposite the first slotted end for receiving an adjacent segmented backsheet extension.

5. The multi-segment header of claim 4, wherein the polymeric articulating joint further comprises a through hole, and a fastener that fastens the articulating joint to the backsheet extension.

6. The multi-segment header of claim 5, wherein the backsheet extension includes a through hole for receiving the fastener therein.

7. The multi-segment header of claim 1, wherein each backsheet extension is directly mounted to the top end of each backsheet.

8. The multi-segment header of claim 1, further comprising a mounting bracket mounting each backsheet extension to the chassis.

9. The multi-segment header of claim 1, wherein each backsheet extension is plate-shaped.

10. The multi-segment header of claim 1, wherein each backsheet extension slopes forwardly relative to the chassis.

11. The multi-segment header of claim 1, wherein each backsheet extension extends substantially in end to end relation with each segment of the multi-segment chassis.

12. The multi-segment header of claim 1, wherein each backsheet extension has an overall height of about 5 to 15 inches.

13. The multi-segment header of claim 1, wherein at least one backsheet extension includes an access panel.

14. The multi-segment header of claim 1, wherein the header includes a chassis hook opening or a reel axis accessible via an access panel in at least one of the backsheet extensions.

15. The multi-segment header of claim 1, wherein the polymeric articulating joint consists essentially of an elastomer.

16. The multi-segment header of claim 1, wherein the polymeric articulating joint is a substantially planar joint.

17. The multi-segment header of claim 1, wherein the polymeric articulating joint is a substantially cuboid joint.

* * * * *